United States Patent

Zernickel et al.

Patent Number: 5,839,835
Date of Patent: Nov. 24, 1998

[54] SELF-ALIGNING BALL BEARING

[75] Inventors: Alexander Zernickel; Herbert Erhardt, both of Herzogenaurach; Rainer Lutz, Markt Erlbach, all of Germany

[73] Assignee: Ina Walzlager Schaeffler KG, Herzogenaurach, Germany

[21] Appl. No.: 932,144

[22] Filed: Sep. 16, 1997

[30] Foreign Application Priority Data

Nov. 26, 1996 [DE] Germany ............ 196 48 854.0

[51] Int. Cl.⁶ .................................. F16C 19/08
[52] U.S. Cl. .......................... 384/497; 384/535
[58] Field of Search ............... 384/497, 535, 384/495, 496, 558, 581

[56] References Cited

U.S. PATENT DOCUMENTS 1,655,074  1/1928  Sharples .

FOREIGN PATENT DOCUMENTS

| | | |
|---|---|---|
| 690 802 | 5/1940 | Germany . |
| GM 19 78 056 | 2/1968 | Germany . |
| GM 69 22 499 | 5/1969 | Germany . |
| 1 944 839 | 7/1973 | Germany . |
| 25 07 900 A1 | 8/1975 | Germany . |
| 32 48 634 A1 | 7/1984 | Germany . |
| 38 40 957 A1 | 7/1989 | Germany . |
| 41 14 643 A1 | 11/1992 | Germany . |
| 44 40 313 A1 | 8/1995 | Germany . |
| 44 38 564 A1 | 5/1996 | Germany . |
| 195 13 668 A1 | 10/1996 | Germany . |

*Primary Examiner*—Lenard A. Footland
*Attorney, Agent, or Firm*—Panitch Schwarze Jacobs & Nadel, P.C.

[57] ABSTRACT

A self-aligning ball bearing for steering shafts (7) of automotive vehicles having an elastic convexity (8) deviating from the circular shape and arranged in at least one peripheral section of at least one of the raceways (2, 4), preferably of the outer raceway (2), so that two adjacent bearing balls (5) are radially prestressed between the raceway convexity (8) and the facing raceway.

8 Claims, 2 Drawing Sheets

SELF-ALIGNING BALL BEARING

BACKGROUND OF THE INVENTION

The invention concerns a self-aligning ball bearing, particularly for a steering shaft of an automotive vehicle, comprising a substantially spherical raceway in an outer bearing ring and a double-track raceway for two rows of balls in an inner bearing ring.

Self-aligning ball bearings of the above-noted type, i.e. double-track bearings which are angularly adjustable by virtue of the hollow spherical raceway, are generally known (FAG Standardprogramm, Katalog 41 500/2 DB).

A drawback of the prior art self-aligning ball bearings is their solid configuration which involves cost-intensive manufacturing. Another drawback of such self-aligning bearings is that they are not free of play and necessitate shafts and housings having exact mounting dimensions.

SUMMARY OF THE INVENTION

It is an object of the invention to create an improved, economically manufacturable self-aligning ball bearing in which the known drawbacks are eliminated.

A further object of the invention is to provide a self-aligning ball bearing which is free of play, can compensate the tilting movements of a steering shaft and bridge tolerances between the housing and the steering shaft.

These and other objects and advantages of the invention will become obvious from the following detailed description.

The invention achieves the above objects by the fact that at least one peripheral section of at least one of the raceways, preferably the outer raceway, comprises an elastic raceway convexity deviating from the circular shape such that at least two adjacent bearing balls are radially prestressed between the raceway convexity and the opposite raceway.

Such a self-aligning ball bearing made in accordance with the invention is not only adjusted without play because contact between the raceways and the bearing balls is established in at least one peripheral section, but it can also compensate for possible radial misalignments of the steering shaft in an outward direction by surmounting the elasticity of the raceway convexity.

In an advantageous development of the invention, the outer bearing ring is made as a thin-walled bush without machining and its raceway comprises a raceway convexity in three peripheral sections offset at 120° to each other.

This so-called delta bearing is not only economical to manufacture but it also loads the steering shaft uniformly from all sides so that, as already described, a self-movement of the steering shaft is only possible when the elasticity of the thin-walled bush is neutralized.

According to a further feature of the invention, the inner bearing ring is made as a thin-walled deep drawn part which comprises a first portion that carries the double-track raceway and merges at one end into a second portion which is bent at an angle of 90° to the bearing axis to bridge the radial design space between a housing and the steering shaft, and this second portion merges into a third portion which extends coaxally to the first portion.

This three-part inner bearing ring is likewise manufacturable by a non-cutting procedure. The central portion extending in radial direction at about 90° to the bearing axis can be made with different dimensions so that different distances between the housing and the steering shaft can be bridged in a simple manner.

According to still another feature of the invention, uniformly spaced recesses are arranged on the periphery of the open end of the third portion so that elastic fingers ending in radially inwardly directed claws are formed and engage into a groove of the steering shaft. This configuration of the inner bearing ring assures an unproblematic fixing of the bearing on the steering shaft.

According to another embodiment of the invention, the third portion can comprise a bulge oriented towards the steering shaft to engage into the groove provided thereon. To improve the form-fitted engagement between the inner bearing ring and the steering shaft, a tolerance ring of a polymeric material can be pressed into an empty space of the inner bearing ring.

Finally, the outer bearing ring of the invention can be made of a thin-walled strip by forming the substantially spherical raceway on one surface of the strip, cutting the strip to the required length, bending the strip into a circular shape and welding together the two abutting ends of the strip so that a bush is obtained in which the deviations from the circular shape are produced by a further forming step.

SHORT DESCRIPTION OF THE DRAWINGS

FIG. 1 is a cross-sectional view through a self-aligning ball bearing of the invention with a partial perspective view of an outer bearing ring, FIG. 2 is a perspective representation of the outer bearing ring of the self-aligning ball bearing of the invention, and FIG. 3 is a longitudinal section through a self-aligning ball bearing of the invention.

DETAILED DESCRIPTION OF THE INVENTION

Figure 1:
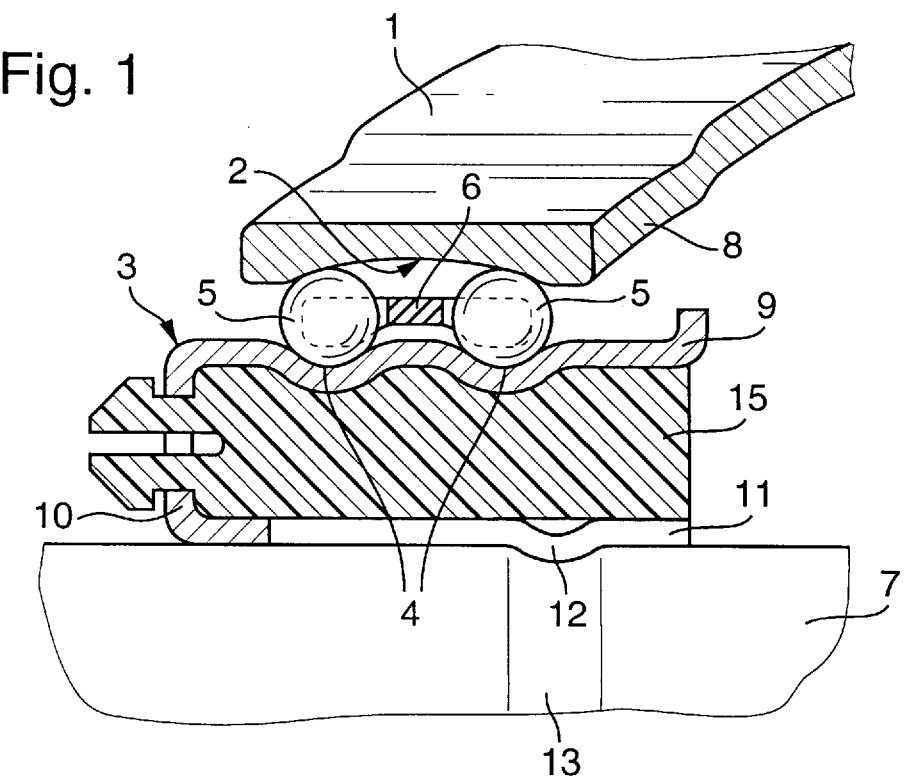
Figure 2:
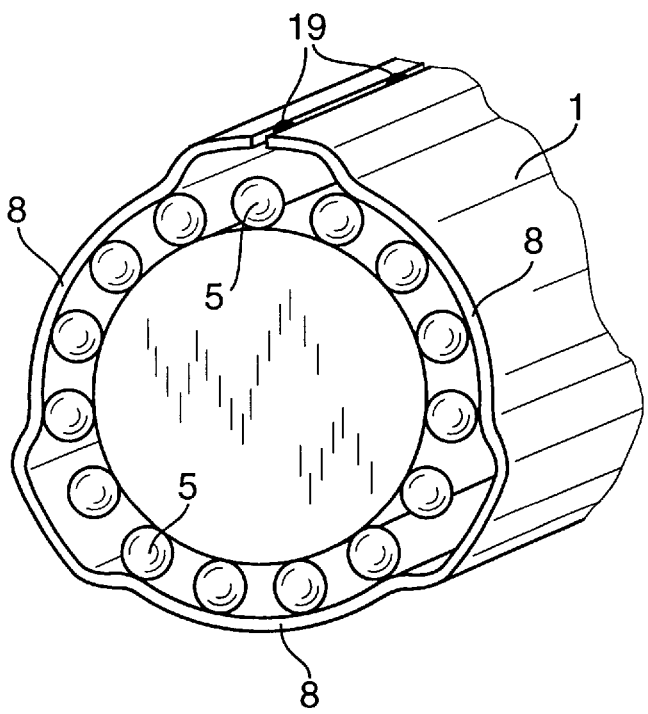
Figure 3:
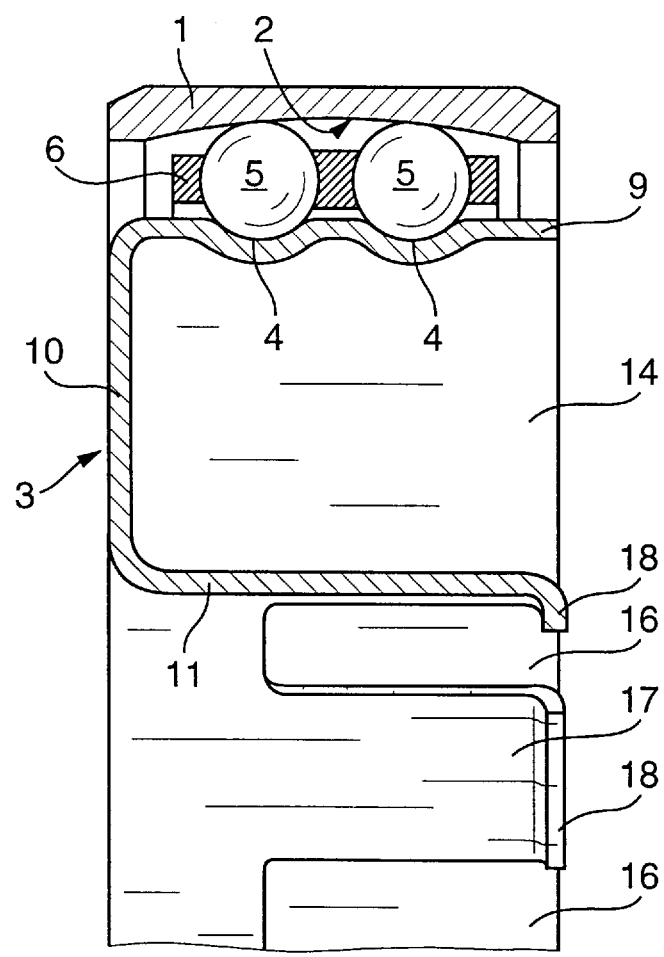

The self-aligning ball bearing of the invention represented in FIGS. 1 to 3 comprises an outer bearing ring 1 on which a substantially spherical raceway 2 is formed in a non-machining (i.e. chipless) procedure, an inner bearing ring 3 on which two groove-type raceways 4 are likewise formed in a non-machining procedure, and two rows of balls 5, guided in a cage 6, which are disposed in rolling contact with the raceways 2, 4. The outer bearing ring 1 is arranged in a housing, not shown, and serves, together with the inner bearing ring 3 and the rows of balls 5, to mount a steering shaft 7.

As can be seen in FIGS. 1 and 2, the raceway 2 of the outer bearing ring 1 comprises three raceway convexities 8 deviating from the circular shape and spaced at 120° to each other along the periphery. These raceway convexities 8 are radially elastic so that, on the one hand, the steering shaft 7 is strongly prestressed in three peripheral sections because the rows of balls 5 bear both against the outer raceway 2 and the inner raceway 4, and on the other hand, a radially outward movement of the steering shaft 7 is possible by a surmounting of the elasticity of the raceway convexities 8.

As can be seen further in FIGS. 1 and 3, the inner bearing ring 3 comprises a first portion 9 which carries the raceways 4 and merges at one end into a second portion 10 extending at 90° to the bearing axis to bridge the radial design space between the housing and the steering shaft 7. This second portion 10 merges into a third portion 11 which surrounds the steering shaft 7 and extends coaxially to the first portion 9 to surround the steering shaft 7.

As shown in FIG. 1, the third portion 11 of the inner bearing ring 3 comprises a bulge 12 which projects into a groove 13 of the steering shaft 7. To improve the form-fitted engagement between the inner bearing ring 3 and the steering shaft 7, a tolerance ring 15 made of a polymeric material is pressed into the empty space 14 of the inner bearing ring 3. However, as represented in FIG. 3, the third portion 11 of the inner bearing ring 3 may also comprise uniformly spaced recesses 16 on its periphery so that elastic fingers 17 are formed. At their free ends, these elastic fingers 17 comprise radially inwardly directed claws 18 which, again, engage into a groove of the steering shaft 7.

If the outer bearing ring 1 is made out of a strip, it is recommended, as shown in FIG. 2, to dispose the weld 19 in the load-free region. In this load-free region, the weld locations 19 of the raceway 2 are not in contact with the rows of balls 5.

What we claim is:

1. A self-aligning ball bearing, adapted for use on a steering shaft (7) of an automotive vehicle, comprising a substantially spherical raceway (2) in an outer bearing ring (1) and a double-track raceway (4) for two rows of balls (5) in an inner bearing ring (3), at least one peripheral section of at least one of the substantially spherical raceway (2) and the double-track raceway (4) comprises an elastic raceway convexity (8) which deviates from a circular shape such that at least two adjacent bearing balls (5) are radially prestressed between the raceway convexity (8) and the other of the substantially spherical raceway (2) and the double-track raceway (4).

2. The self-aligning ball bearing of claim 1, wherein the outer bearing ring (1) is made as a thin-walled bush without machining, and the substantially spherical raceway (2) includes a raceway convexity (8) in three peripheral sections offset approximately 120° to each other.

3. The self-aligning ball bearing of claim 1, wherein the bearing has an axis and the inner bearing ring (3) is made as a thin-walled deep drawn part which comprises a first portion (9) that carries the double-track raceway (4) and merges at one end into a second portion (10) which is bent at an angle of 90° to the bearing axis to bridge a radial space between a housing and the steering shaft (7), and said second portion (10) merges into a third portion (11) which extends coaxially to the first portion (9).

4. The self-aligning ball bearing of claim 3, wherein uniformly spaced recesses (16) are arranged on a periphery of an open end of the third portion (11) so that elastic fingers (17) ending in radially inwardly directed claws (18) are formed and are adapted to engage into a groove (13) of the steering shaft (7).

5. The self-aligning ball bearing of claim 3, wherein the third portion (11) comprises a bulge (12) which is adapted to be oriented towards the steering shaft (7) and to be engaged into a groove (13) on the steering shaft (7).

6. The self-aligning ball bearing of claim 5, wherein a tolerance ring (15) of a polymeric material is pressed into an empty space (14) defined by the first, second and third portions (9, 10, 11) of the inner bearing ring (3).

7. The self-aligning ball bearing of claim 3, wherein a tolerance ring (15) of a polymeric material is pressed into an empty space (14) defined by the first, second and third portions (9, 10, 11) of the inner bearing ring (3).

8. A method of making the outer bearing ring (1) of claim 1 comprising the steps of forming the substantially spherical raceway (2) on one surface of a thin-walled strip, cutting the strip to a required length, bending the strip into a circular shape, welding together two abutting ends of the strip to obtain a bush, and producing raceway convexities deviating from the circular shape in the bush by deforming.

* * * * *